United States Patent
Ide et al.

(10) Patent No.: US 7,452,185 B2
(45) Date of Patent: Nov. 18, 2008

(54) BLADE-PITCH-ANGLE CONTROL DEVICE AND WIND POWER GENERATOR

(75) Inventors: Kazunari Ide, Nagasaki (JP); Yoshiyuki Hayashi, Nagasaki (JP); Masaaki Shibata, Nagasaki (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 207 days.

(21) Appl. No.: 10/567,971

(22) PCT Filed: Sep. 9, 2004

(86) PCT No.: PCT/JP2004/013144

§ 371 (c)(1),
(2), (4) Date: Oct. 20, 2006

(87) PCT Pub. No.: WO2005/026537

PCT Pub. Date: Mar. 24, 2005

(65) Prior Publication Data

US 2007/0041837 A1    Feb. 22, 2007

(30) Foreign Application Priority Data

Sep. 10, 2003  (JP) ............................. 2003-318312
May 13, 2004   (JP) ............................. 2004-143642

(51) Int. Cl.
*F03D 7/04* (2006.01)
(52) U.S. Cl. .............................. 416/35; 416/40; 416/61
(58) Field of Classification Search ............... 416/40, 416/61, 35
See application file for complete search history.

(56) References Cited

U.S. PATENT DOCUMENTS 6,441,507 B1 *  8/2002  Deering et al. ................. 290/44
7,160,083 B2 *  1/2007  Pierce et al. .................... 416/61

FOREIGN PATENT DOCUMENTS

| GB | 2067247 A | 7/1981 |
|----|-----------|--------|
| JP | 57-131874 A | 8/1982 |
| JP | 59-101587 A | 6/1984 |
| JP | 06-117353 A | 8/1994 |
| JP | 2001-511497 A | 8/2001 |
| JP | 2003-113769 A | 4/2003 |
| JP | 2003-201952 A | 7/2003 |
| WO | 01/86141 | 11/2001 |

* cited by examiner

*Primary Examiner*—Ninh H Nguyen
(74) *Attorney, Agent, or Firm*—Lowe Hauptman Ham & Berner, LLP

(57) ABSTRACT

A blade-pitch-angle control device includes a memory unit in which predetermined parameters that affect the load fluctuation of blades, azimuth angles, and pitch-angle command values are stored in association with each other; an azimuth-angle detecting unit that detects the azimuth angle of each of the blades; a parameter-detecting unit that detects the predetermined parameters; a command-value receiving unit that receives pitch-angle command values for each of the blades from the memory unit, the pitch-angle command values being selected on the basis of the azimuth angle of each blade detected by the azimuth-angle detecting unit and the predetermined parameters detected by the parameter-detecting unit; and a pitch-angle-control command-value generating unit that generates pitch-angle-control command values for individually controlling the pitch-angle of each blade on the basis of the pitch-angle command values and a common-pitch-angle command value.

5 Claims, 12 Drawing Sheets

AZIMUTH ANGLE : Ψ

FLUCTUATING WIND

TOWER SHADOW

WIND SHEAR

BLADE-PITCH-ANGLE CONTROL DEVICE AND WIND POWER GENERATOR

CROSS-REFERENCE TO RELATED APPLICATIONS

The present application is based on International Application No. PCT/JP/2004/013144 filed on Sep. 9, 2004, which in turn corresponds to Japanese Application Number 2003-318312 filed Sep. 10, 2003 and Japanese Application Number 2004-143642 filed May 13, 2004, and priority is hereby claimed under 35 USC § 119 based on these applications. Each of these applications are hereby incorporated by reference in their entirety into the present application.

TECHNICAL FIELD

The present invention relates to a wind power generator, and in particular, to a blade-pitch-angle control device for controlling a blade-pitch-angle of a windmill.

BACKGROUND ART

As shown in a schematic view in FIG. 11, a known propeller windmill used in wind power generators includes, for example, three blades composed of a first blade 1, a second blade 2, and a third blade 3, a rotor 5 serving as a link mechanism for linking the three blades, a tower 4, and so on.

In general, each of the blades of such a propeller windmill is controlled depending on the wind conditions so as to obtain a predetermined rotational speed and output of a power generator.

FIG. 12 shows an example of the structure of a known pitch-angle control device. As shown in the figure, the known pitch-angle control device includes a common-pitch-angle command-value generating unit 15 for generating a common-pitch-angle command value on the basis of the difference between a preset value of a rotational speed or output of a power generator and a controlled value at that time. Actuators control each blade so as to have identical pitch-angles on the basis of the common-pitch-angle command value generated by the common-pitch-angle command-value generating unit 15, thus controlling the pitch-angle of the blades.

The inflow wind speed to a windmill is affected by the ground, as shown in FIG. 13A (the wind speed characteristics affected by the ground are hereinafter referred to as "wind shear characteristics"), or by the tower supporting the windmill, as shown in FIG. 13B (the wind speed characteristics affected by the tower are hereinafter referred to as "tower characteristics"). Spatial disorder and temporal disorder of the wind speed are added to the effects described above, resulting in an uneven wind speed distribution in the blade rotation area, as shown in FIG. 13C. Under such uneven wind speed conditions, since the instantaneous values of the aerodynamic output from each of the blades are different from each other, the values of the thrust, the moment, and the like of the blades are also different from each other. As a result, a load fluctuation in each blade occurs, thereby shortening the lifetime of the blades.

To overcome this problem, for example, PCT Japanese Translation Patent Publication No. 2001-511497 discloses a technology in which the angle of attack of wind flowing to each blade and the load are measured, and the blades are individually controlled on the basis of these values.

PCT Japanese Translation Patent Publication No. 2001-511497.

PCT Publication No. WO01/86141 pamphlet

DISCLOSURE OF INVENTION

In the invention disclosed in PCT Japanese Translation Patent Publication No. 2001-511497, the load applied to each part of a wind power generator, the angle of attack of wind flowing to the blades, and the like are instantaneously calculated on the basis of detected values from a plurality of sensors, and the pitch-angle is controlled so as to decrease the instantaneous load fluctuation. In order to effectively decrease the load fluctuation, a series of processes from detection by the sensors to feedback control must be performed substantially in real time.

However, according to the above invention, since the instantaneous load is obtained by calculation based on each of the detected values, the process disadvantageously becomes complex and the instantaneous load cannot be rapidly obtained. Such an increase in the processing time also causes a delay in the feedback control and decreases the accuracy of the pitch-angle control.

Furthermore, in the above invention, a plurality of wind power sensors and strain gauges must be provided for each of the blades. Since high reliability is required for these sensors, expensive sensors must be used, resulting in the problem of high cost.

In addition, since the wind speed is measured with an anemometer disposed in the airflow behind the blades, the measurement is affected by wind speed fluctuations due to the rotation of the blades. Therefore, the wind speed cannot be accurately detected.

The present invention has been made in order to solve the above problems, and it is an object of the present invention to provide a pitch-angle control device in which a load fluctuation generated in a wind power generator can be further decreased by improving the accuracy of pitch-angle control.

In order to solve the above problems, the present invention provides the following solutions.

The present invention provides a blade-pitch-angle control device used for a wind power generator having a plurality of blades, the blade-pitch-angle control device including a memory device in which predetermined parameters that affect the load fluctuation of the blades, azimuth angles, and pitch-angle command values are stored in association with each other; an azimuth-angle detecting device that detects the azimuth angle of each of the blades; a parameter-detecting device that detects the predetermined parameters; a command-value receiving device that receives the pitch-angle command values for each of the blades from the memory device, the pitch-angle command values being selected on the basis of the azimuth angle of each blade detected by the azimuth-angle detecting device and the predetermined parameters detected by the parameter-detecting device; and a pitch-angle-control command-value generating device that generates pitch-angle-control command values for individually controlling the pitch-angle of each blade on the basis of the pitch-angle command values received by the command-value receiving device and a common-pitch-angle command value that is common to each blade, the common-pitch-angle command value being determined by output information of the wind power generator.

According to the present invention, the optimum pitch-angle command values which are related to various parameters affecting the load fluctuation of the blades are stored in advance in the memory device. Accordingly, during control, the command-value receiving device just reads out from the memory device the optimum pitch-angle command values selected based on the various parameters, thereby performing pitch-angle control that is optimum for the operational state of the windmill.

Thus, since the optimum pitch-angle command values can be immediately obtained from various parameters without performing a process for calculating the load fluctuation of the blades or the like, the process can be simplified and rapidly performed.

In this case, since the pitch angles can be controlled in real time, this device can immediately cope with dynamic changes of the operational state of the wind power generator and the load fluctuation can be further reduced. Consequently, the lifetime of each blade can be maintained for a long period and a stable power generation output can be achieved.

The pitch-angle-control command-value generating device causes the optimum pitch-angle command values, which are received by the command-value receiving device and which are determined in consideration of the operational state of the windmill, to be reflected in the common-pitch-angle command value, which is generated for performing feedback control of the power generation output of the wind power generator and which is used as a common pitch-angle command value in each blade. Thus, the pitch-angle-control command-value generating unit generates pitch-angle-control command-values for controlling the blade pitch-angle of each blade. Accordingly, each blade can be controlled so as to have the optimum pitch-angle, considering the output fluctuation and the operational state of the wind power generator.

In the above blade-pitch-angle control device, the pitch-angle command values stored in the memory device are preferably set to values in which the wind shear characteristics at the installation location of the wind power generator are reflected.

Wind speed, air density, the output of the wind power generator, and the like are dynamically changed according to the conditions. In contrast, the wind shear is uniquely determined depending on the site conditions of the wind power generator.

Thus, in the information stored in the memory device, not only parameters that dynamically change but also information such as the wind shear, which is uniquely determined depending on the site conditions, are considered. Therefore, the pitch-angle can be controlled with very high accuracy.

In the above blade-pitch-angle control device, the predetermined parameters may include the wind speed, and the parameter-detecting device is preferably a wind-speed estimating device that includes a characteristic table relating the wind speed and an output of the wind power generator and that estimates the wind speed by reading out a wind speed corresponding to the output of the wind power generator from the characteristic table.

The wind speed is one of the important parameters required for selecting the pitch-angle command values. Whether load fluctuation and output fluctuation can be precisely reduced or not significantly depends on the detection accuracy of the wind speed, and therefore, the wind speed must be detected with high accuracy.

However, in the conventional method in which the wind speed is measured with an anemometer disposed in the airflow behind a windmill, the measurement is directly affected by wind speed fluctuations due to the rotation of the blades. Consequently, the wind speed cannot be accurately measured.

According to the present invention, the wind speed is measured not physically by the wind-speed detecting device but by a simple process in software on the basis of the output of the wind power generator, which has a close relationship with the wind speed. Thereby, highly accurate wind speed can be obtained, and in addition, the cost can be reduced.

Instead of such wind-speed estimating device, an anemometer (such as a laser Doppler anemometer) that measures the wind speed before the wind flows to the windmill may be used. Since this configuration is not affected by the airflow behind the blades, highly accurate wind speed can be obtained.

When the laser Doppler anemometer is used, a device for supplying tracer particles from upstream of the windmill toward the windmill is provided. Alternatively, dust or water vapor mixed in air that flows to the windmill may be used as a tracer to obtain scattered light from the dust or the water vapor, and thus laser Doppler measurement may be performed. In this case, the device for supplying tracer particles need not be separately provided.

The above blade-pitch-angle control device preferably includes a frequency-component extraction device that extracts a frequency component corresponding to an integral multiple of the number of blades from any one of the power generation output of the wind power generator, the number of revolutions of the power generator, and the number of rotor revolutions; and a calculation device that calculates a pitch-angle for eliminating the load fluctuation due to the frequency fluctuation on the basis of the extracted frequency-component, wherein the pitch-angle-control command-value generating device preferably causes the pitch-angle calculated by the calculation device to be reflected in the pitch-angle-control command value.

Even when pitch-angle control values are determined in consideration of fluctuations of various parameters such as the wind speed, it is difficult to completely eliminate the load fluctuation and the fluctuation of power generation output because of an error or a time-lag due to feedback control.

On the other hand, it is known that the frequency band in which the output fluctuation significantly occurs depends on the number of blades. Accordingly, a pitch-angle for eliminating such a significant output fluctuation is determined and the resulting pitch-angle is reflected in the blade-pitch-angle-control command value, thereby further decreasing the output fluctuation.

That is, in a wind power generator using a constant-speed windmill, the frequency-component extraction device extracts a frequency component corresponding to an integral multiple of the number of blades from the output of the wind power generator. On the other hand, in a wind power generator using a variable-speed windmill, the frequency-component extraction device extracts a frequency component corresponding to an integral multiple of the number of blades from the number of revolutions of the power generator or the number of rotor revolutions.

For example, the calculation device calculates the frequency component extracted by the frequency-component extraction device on the basis of a predetermined algorithm to calculate fluctuating pitch-angles in the frequency domain. Furthermore, the calculation device performs an inverse frequency analysis using the fluctuating pitch-angles to obtain fluctuating pitch-angles in the time domain.

The fluctuating pitch-angles thus obtained serve as pitch-angles for eliminating a significant load fluctuation.

The pitch-angle-control command-value generating device causes the pitch-angles for canceling out the significant output fluctuation to be reflected in the pitch-angle-control command values.

Thus, the fluctuation of power generation output that significantly occurs can be eliminated at a single point and more stable power generation output can be achieved.

The present invention provides a wind power generator having a plurality of blades, the wind power generator including a blade-pitch-angle control device including a memory device in which predetermined parameters that affect the load fluctuation of the blades, azimuth angles, and pitch-angle command values are stored in association with each other; an azimuth-angle detecting device that detects the azimuth angle of each of the blades; a parameter-detecting device that detects the predetermined parameters; a command-value receiving device that receives the pitch-angle command values for each of the blades from the memory device, the pitch-angle command values being selected on the basis of the azimuth angle of each blade detected by the azimuth-angle detecting device and the predetermined parameters detected by the parameter-detecting device; and a pitch-angle-control command-value generating device that generates pitch-angle-control command values for individually controlling the pitch-angle of each blade on the basis of the pitch-angle command values received by the command-value receiving device and a common-pitch-angle command value that is common to each blade, the common-pitch-angle command value being determined by output information of the wind power generator.

The present invention provides a blade-pitch-angle control device used for a wind power generator having a plurality of blades, the blade-pitch-angle control device including load-measuring devices that measure a load applied to the blades or mechanical parts constituting a windmill at predetermined azimuth angles; an adjusting pitch-angle command-value generating device that generates an adjusting pitch-angle command value for each blade for reducing the load measured with each of the load-measuring devices; and a pitch-angle-control command-value generating device that generates a pitch-angle-control command-value for each blade by causing the adjusting pitch-angle command value generated for each blade to be reflected in a common-pitch-angle command value for equally controlling the blades.

Since the load-measuring devices measure the load not at predetermined time intervals but at predetermined azimuth-angles, the load-measuring devices can be applied not only to constant-speed windmills but also to variable-speed windmills in which the rotational speed of the blades changes depending on the operational state.

For example, the adjusting pitch-angle command-value generating device calculates the optimum pitch-angle for each blade for reducing the load measured by each of the load-measuring devices to generate adjusting pitch-angle command-values. The pitch-angle-control command-value generating device causes these adjusting pitch-angle command-values to be reflected in the pitch-angle-control command-values for controlling the pitch angles of the blades. Thereby, the load fluctuation can be decreased.

The present invention provides a blade-pitch-angle control device used for a wind power generator having a plurality of blades, the blade-pitch-angle control device including load-measuring devices that measure a load applied to the blades or mechanical parts constituting a windmill at predetermined azimuth angles; a calculation device that calculates a periodic fluctuation of the load on the basis of the measured values measured by the load-measuring devices; an adjusting pitch-angle command-value generating device that generates an adjusting pitch-angle command value for each blade for reducing a load fluctuation on the basis of the calculation results of the calculation device; and a pitch-angle-control command-value generating device that generates a pitch-angle-control command-value for each blade by causing the adjusting pitch-angle command value generated for each blade to be reflected in a common-pitch-angle command value for equally controlling the blades.

The present inventors focus on the fact that a significant load fluctuation of the blades periodically occurs. Consequently, the load-measuring devices and the calculation device are provided as devices that detect the load fluctuation during one revolution of a rotor.

The load-measuring devices measure a load applied to each of the blades at predetermined azimuth angles. Thus, since the load is measured not at predetermined time intervals but at predetermined azimuth-angles, the load-measuring devices can be applied to variable-speed windmills in which the rotational speed of the blades changes.

The calculation device obtains measured values measured with the load-measuring devices at each azimuth angle, the measured values corresponding to a predetermined period (for example, corresponding to one revolution), and determines the characteristics of the load on the basis of the measured values. Thus, information on the load fluctuation in each blade can be obtained.

The adjusting pitch-angle command-value generating device calculates the adjusting pitch-angle command values for eliminating the load fluctuation, and the pitch-angle-control command-value generating device causes these adjusting pitch-angle command values to be reflected in the control of the pitch angle of each blade. Thereby, the significant load fluctuation that periodically occurs can be reduced.

Thus, since the load fluctuation is decreased by focusing on the load fluctuation that periodically occurs, the load fluctuation can be efficiently decreased by a process much simpler than the conventional pitch-angle control that decreases instantaneous load fluctuations. Consequently, each blade can be controlled so as to have the optimum pitch-angle, and the lifetime of the blades and mechanical parts constituting the windmill can be extended.

In the present invention, since measured values corresponding to at least one cycle are obtained and feedback control based on these measured values is then performed, a time-lag occurs. However, the load fluctuation that is focused on by the present invention periodically occurs at substantially the same azimuth angle. Therefore, even when the time-lag due to the feedback control occurs, the load fluctuation can be eliminated with high accuracy.

In the above blade-pitch-angle control device, each of the load-measuring devices preferably includes an azimuth-angle measuring device that measures the azimuth angle of each blade at predetermined time intervals, a trigger-generating device that generates a trigger signal when the measurement result matches a predetermined azimuth angle, and a measuring device that measures a load on the basis of the trigger signal.

Thus, since the load-measuring devices include generally well known mechanisms, the load-measuring devices can be achieved simply and at low cost.

Examples of the measuring device include a strain gauge, a load cell, and an optical fiber sensor.

In the above blade-pitch-angle control device, each of the load-measuring devices preferably includes an encoder that generates a trigger when the azimuth angle reaches a predetermined angle and a measuring device that measures a load on the basis the trigger.

The encoder and the measuring device are generally well known mechanisms. Thus, since the load-measuring devices include generally well known mechanisms, the load-measuring devices can be achieved simply and at low cost.

Examples of the measuring device include a strain gauge, a load cell, and an optical fiber sensor.

The present invention provides a blade-pitch-angle control device used for a wind power generator having a plurality of blades, the blade-pitch-angle control device including an acceleration-measuring device that measures the acceleration applied to the blades or mechanical parts constituting a windmill at predetermined azimuth angles; an adjusting pitch-angle command-value generating device that generates an adjusting pitch-angle command value for each blade for reducing the acceleration measured with the acceleration-measuring device; and a pitch-angle-control command-value generating device that generates a pitch-angle-control command-value for each blade by causing the adjusting pitch-angle command value generated for each blade to be reflected in a common-pitch-angle command-value for equally controlling the blades.

The adjusting pitch-angle command-value generating device, for example, calculates the optimum pitch-angle for each blade for reducing the acceleration measured with the acceleration-measuring device and generates adjusting pitch-angle command values. The pitch-angle-control command-value generating device causes these adjusting pitch-angle command values to be reflected in the pitch-angle-control command values that control the pitch-angles of the blades, thereby reducing the acceleration.

Since the acceleration and the load fluctuation are correlated, a decrease in the acceleration can also decrease the load fluctuation.

The present invention provides a wind power generator having a plurality of blades, the wind power generator including a blade-pitch-angle control device including load-measuring devices that measure a load applied to the blades or mechanical parts constituting a windmill at predetermined azimuth angles; an adjusting pitch-angle command-value generating device that generates an adjusting pitch-angle command value for each blade for reducing the load measured with each of the load-measuring devices; and a pitch-angle-control command-value generating device that generates a pitch-angle-control command-value for each blade by causing the adjusting pitch-angle command values generated for each blade to be reflected in a common-pitch-angle command value for equally controlling the blades.

Since the wind power generator includes such a blade-pitch-angle control device, each blade can be controlled so as to have the optimum pitch-angle and a wind power generator including long-life blades and mechanical parts constituting a windmill can be realized.

BEST MODE FOR CARRYING OUT THE INVENTION

Embodiments according to the present invention will now be described with reference to the drawings in the order of a first embodiment and a second embodiment.

First Embodiment

Figure 1:
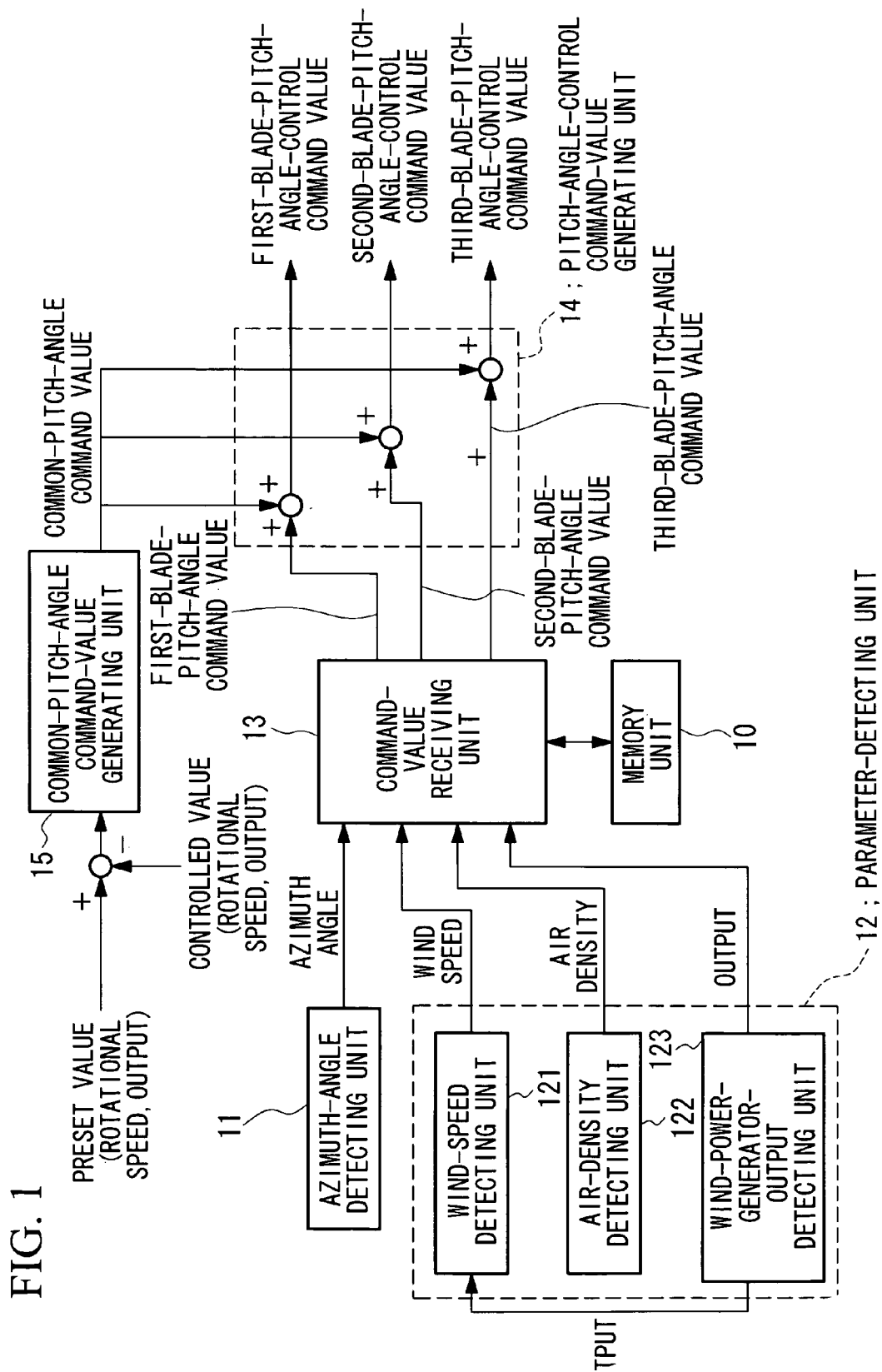
FIG. 1 a block diagram showing the structure of a blade-pitch-angle control device according to a first embodiment of the present invention.

FIG. 1 is a block diagram showing the structure of a blade-pitch-angle control device that is applied to a wind power generator using a constant-speed windmill.

As shown in FIG. 1, the blade-pitch-angle control device according to this embodiment includes a memory unit (memory device) 10, an azimuth-angle detecting unit (azimuth-angle detecting device) 11, a parameter-detecting unit (parameter-detecting device) 12, a command-value receiving unit (command-value receiving device) 13, a pitch-angle-control command-value generating unit (pitch-angle-control command-value generating device) 14, and a common-pitch-angle command-value generating unit (common-pitch-angle command-value generating device) 15.

In the memory unit 10, predetermined parameters that affect the load fluctuation of blades, for example, wind speed, temperature, and output of the wind power generator; azimuth angles; and pitch-angle command values are stored in association with each other.

Figure 2:
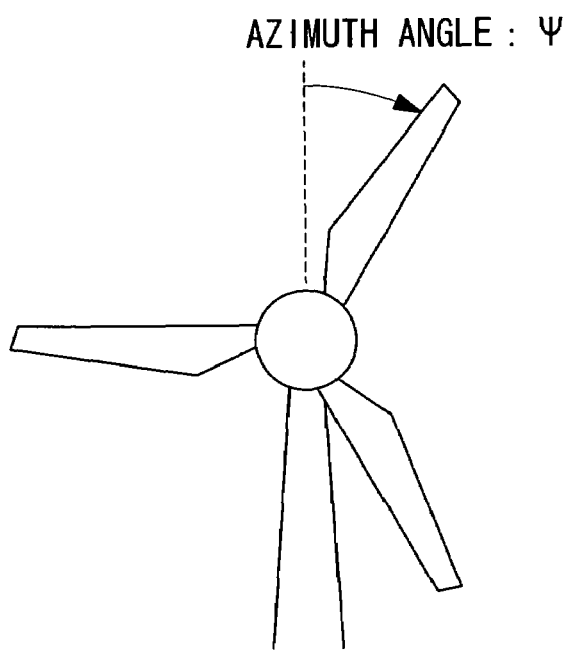
FIG. 2 a view illustrating an azimuth angle.

As shown in FIG. 2, the azimuth angle represents an angle formed relative to the vertical direction of the windmill. The azimuth angle when a blade is located at the top of the windmill is defined as 0°, and the azimuth angle when the blade is located at the bottom of the windmill is defined as 180°. The detailed contents stored in the memory unit 10 are described below.

The azimuth-angle detecting unit 11 detects the azimuth angle of each blade at predetermined intervals and outputs it to the command-value receiving unit 13. For example, the azimuth angle can be determined from an output of a rotary encoder provided on a rotation axis.

The parameter-detecting unit 12 includes a wind-speed detecting unit (wind-speed detecting device) 121 that detects wind speed, an air-density detecting unit 122 that detects air density, and a wind-power-generator-output detecting unit 123 that detects the output of the wind power generator.

Figure 3:
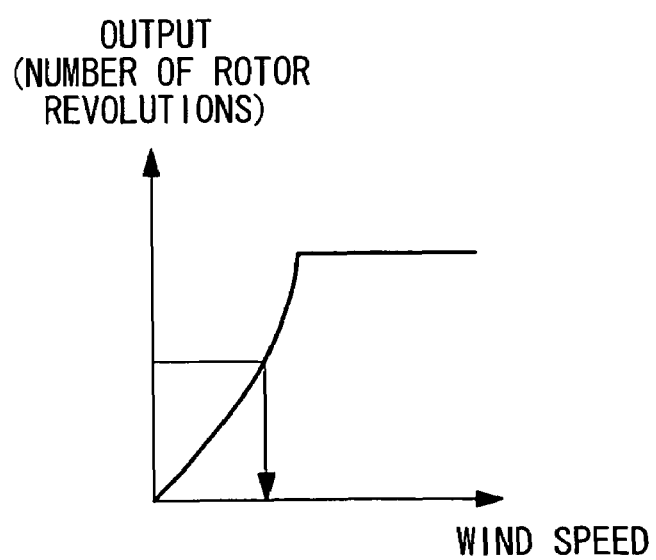
FIG. 3 a graph showing an example of a characteristic table relating wind speed and output of a wind power generator.

The wind-speed detecting unit 121 includes a characteristic table (refer to FIG. 3) in which wind speed is related with the output of the wind power generator. The wind-speed detecting unit 121 receives the output of the wind power generator from the wind-power-generator-output detecting unit 123 at predetermined intervals. A wind speed corresponding to the output is read out from the characteristic table to estimate the wind speed. The estimated wind speed is output to the command-value receiving unit 13. Instead of such a method of estimating the wind speed, an anemometer (such as a laser Doppler anemometer) that measures the wind speed before the wind flows to the windmill may be used. Since this configuration is not affected by the airflow behind the blades, highly accurate wind speed can be obtained.

When the laser Doppler anemometer is used, a device for supplying tracer particles from upstream of the windmill toward the windmill is provided. Alternatively, dust or water vapor mixed in air that flows to the windmill may be used as a tracer to obtain scattered light from the dust or the water vapor, and thus laser Doppler measurement may be performed. In this case, the device for supplying tracer particles need not be separately provided.

The air-density detecting unit 122 measures air temperature and air pressure at predetermined intervals, and determines the air density from the measured values on the basis of the characteristics of the air density, the air temperature, and the air pressure. The air density can be uniquely determined by the air temperature and the air pressure. For example, the air-density detecting unit 122 has a map in which air temperature, air pressure, and air density are related with each other in advance. An air density selected by measured values of air temperature and air pressure is obtained from the map, thus determining the air density. Alternatively, the air-density detecting unit 122 may have a relational expression including air temperature, air pressure, and air density. The air density may be calculated by substituting measured values of air temperature and air pressure in the relational expression.

The command-value receiving unit 13 receives pitch-angle command values from the memory unit 10. The pitch-angle command values are selected on the basis of azimuth angles of the blades input from the azimuth-angle detecting unit 11 and various parameters (such as wind speed, air density, and power generation output) input from the parameter-detecting unit 12. The command-value receiving unit 13 outputs the pitch-angle command values of the blades, i.e., a first-blade-pitch-angle command value, a second-blade-pitch-angle command value, and a third-blade-pitch-angle command value, to the pitch-angle-control command-value generating unit 14.

The common-pitch-angle command-value generating unit 15 calculates a common-pitch-angle command value for commonly controlling pitch-angles of the three blades, i.e., the first blade to the third blade, from the difference between the preset values of the number of revolutions of the power generator (information on power generation output) or the power generation output (information on power generation output) and the controlled value at that time so that the power generation output of the wind power generator corresponds with the rated output (preset value), and outputs the common-pitch-angle command value to the pitch-angle-control command-value generating unit 14. For example, the common-pitch-angle command-value generating unit 15 is composed of a known PID control system.

The pitch-angle-control command-value generating unit 14 generates pitch-angle-control command values for individually controlling the pitch-angles of the blades on the basis of the pitch-angle command value for each blade input from the command-value receiving unit 13 and the common-pitch-angle command value input from the common-pitch-angle command-value generating unit 15. Specifically, the pitch-angle-control command value for each blade is generated by adding each of the pitch-angle command values to the common-pitch-angle command value. Subsequently, the pitch-angle-control command-value generating unit 14 outputs the pitch-angle-control command values that are individually obtained for each of the blades to actuators, which are devices for controlling the pitch-angles of the blades. The actuator is a known mechanism such as a hydraulic cylinder or an electric motor that is installed in each blade.

The content stored in the memory unit 10 will now be described in detail.

First, wind speed, air density, output of the wind power generator, and the like are used as parameters and various values are set for these parameters. Thus, the optimum pitch-angle in various test patterns is determined by a computer simulation.

For example, as a test pattern, the wind speed is set to A (m/s), the air density is set to B (g/cm$^3$), and the power generation output is set to C (kW). Data about the fluctuating load when the pitch-angle is varied under these conditions is collected.

Subsequently, the resulting data is checked to select a pitch-angle that provides the minimum fluctuating load. A characteristic table relating the selected pitch-angle and the azimuth angle is prepared.

The above operation is repeated while values of the parameters (wind speed A (m/s), air density B (g/m$^3$), and power generation output C (kW)) are varied to prepare characteristic tables for various conditions. These characteristic tables are related with the preset values of each of the parameters (preset values of wind speed, air density, power generation output, and the like) in the test patterns and written in the memory unit 10.

Thus, by determining values of the parameters, a pitch-angle that is the most suitable for the conditions can be obtained.

Figure 13C:
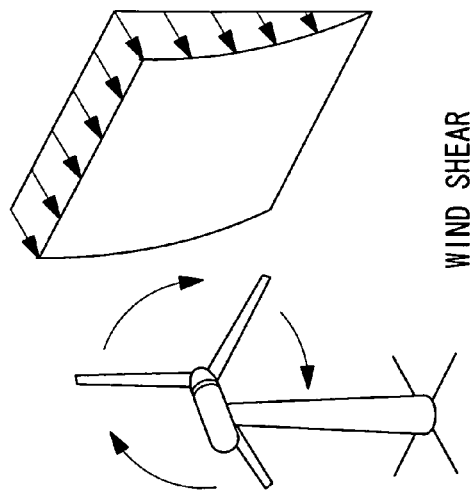
FIG. 13 views illustrating wind shear characteristics, tower shadow characteristics, and wind speed distribution.
Figure 13B:
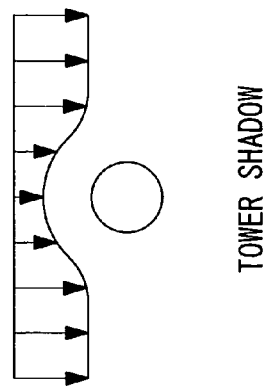
Figure 13A:
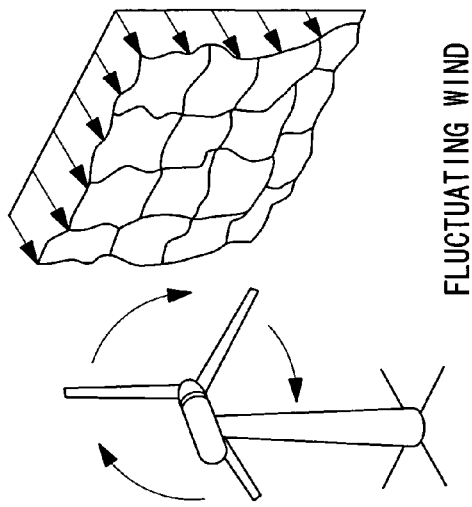

In the above simulation, more appropriate pitch-angle can be obtained by setting the wind shear characteristics and the tower shadow characteristics (refer to FIGS. 13A and 13B) as fixed values in advance.

For example, the above-described parameters, such as wind speed, dynamically change depending on the conditions. On the other hand, the wind shear characteristics and the tower shadow characteristics are uniquely determined depending on the location of the windmill or the windmill structure. By performing the simulation in consideration of these characteristics, the optimum pitch-angle for the windmill can be obtained. Consequently, more accurate control of the blade-pitch-angles can be performed.

The characteristic table will now be described more specifically by way of an example.

Figure 4:
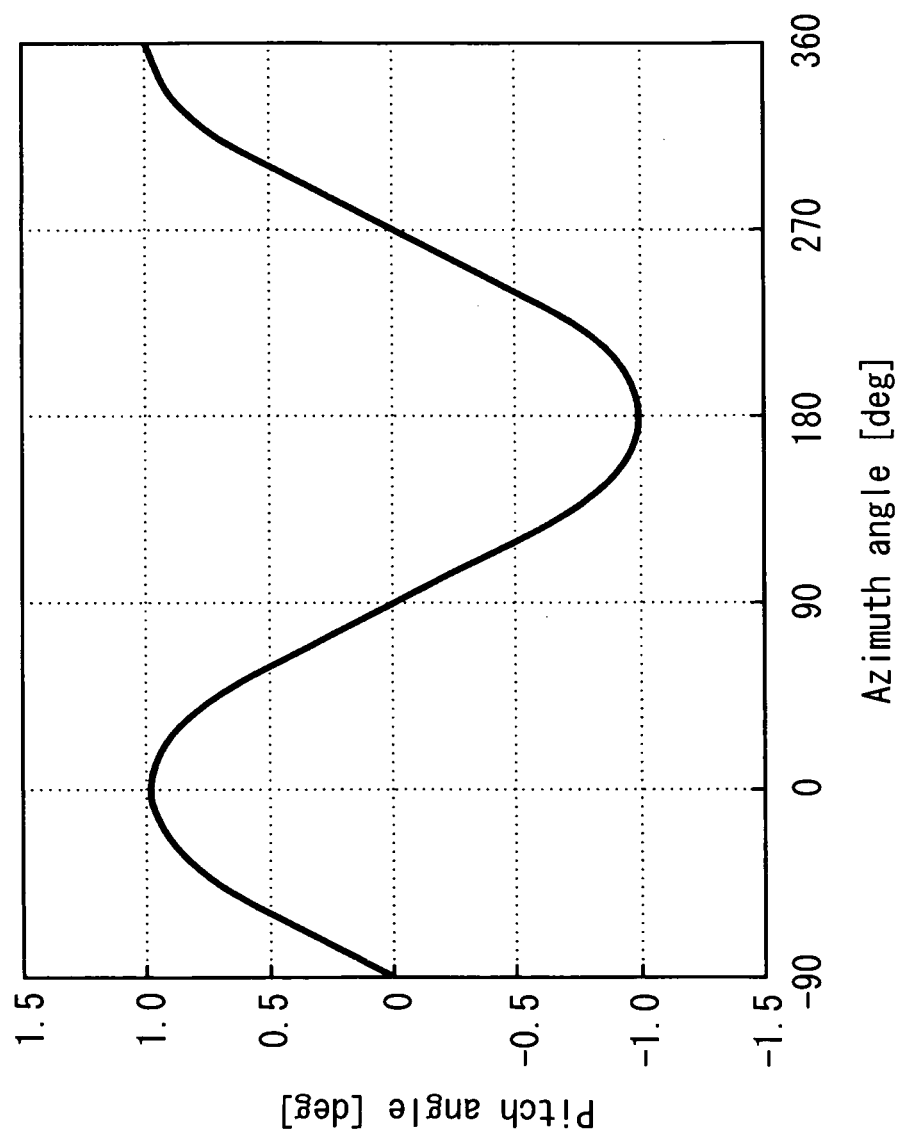
FIG. 4 a graph showing an example of a characteristic table under steady wind conditions (having a temporally constant and two-dimensionally uniform wind speed).

First, FIG. 4 shows a characteristic table under steady wind conditions (having a temporally constant and two-dimensionally uniform wind speed). As shown in the figure, the characteristic table includes an abscissa indicating the azimuth angle (deg) and an ordinate indicating the pitch-angle (deg). The characteristic table shows a cosine wave in which the maximum pitch-angle (for example, 1°) is located at an azimuth angle of 0° and the minimum pitch-angle (for example, −1°) is located at an azimuth angle of 180°. The angles in the figure represent relative values.

This indicates the following: At an azimuth angle of 0°, where the wind speed at the blade becomes the maximum, the pitch-angle must be increased to decrease the aerodynamic performance. On the other hand, at an azimuth angle of 180°, where the wind speed at the blade becomes the minimum, the pitch-angle must be decreased to improve the aerodynamic performance.

Characteristic tables under various conditions obtained by the above simulation also have a fundamental shape substantially the same as that of the characteristic table shown in FIG. 4, but have different amplitude and phase.

For example, when the air density and the power generation output of the wind power generator are set as fixed values and only the wind speed is varied, as the wind speed increases, the effect of the load fluctuation of the blade increases (the load is proportional to the square of the wind speed).

Accordingly, when the wind speed is varied, as the wind speed increases, the amplitude of the cosine wave shown in FIG. 4 also increases.

A blade of the windmill basically forms an upward angle, expressed as a "tilt angle" (generally about 5°), so that a clearance is provided for preventing the blade from hitting the tower. Because of the effect of this tilt angle, the wind flowing to the windmill generally blows upward.

Under low wind speed conditions, the above effect of the wind speed itself is small and need not be considered. However, an increase in the wind speed increases the effect of the tilt angle. A pitch-angle correction value for canceling out the effect of the tilt angle on the wind exhibits the characteristics shown in FIG. 5.

Figure 5:
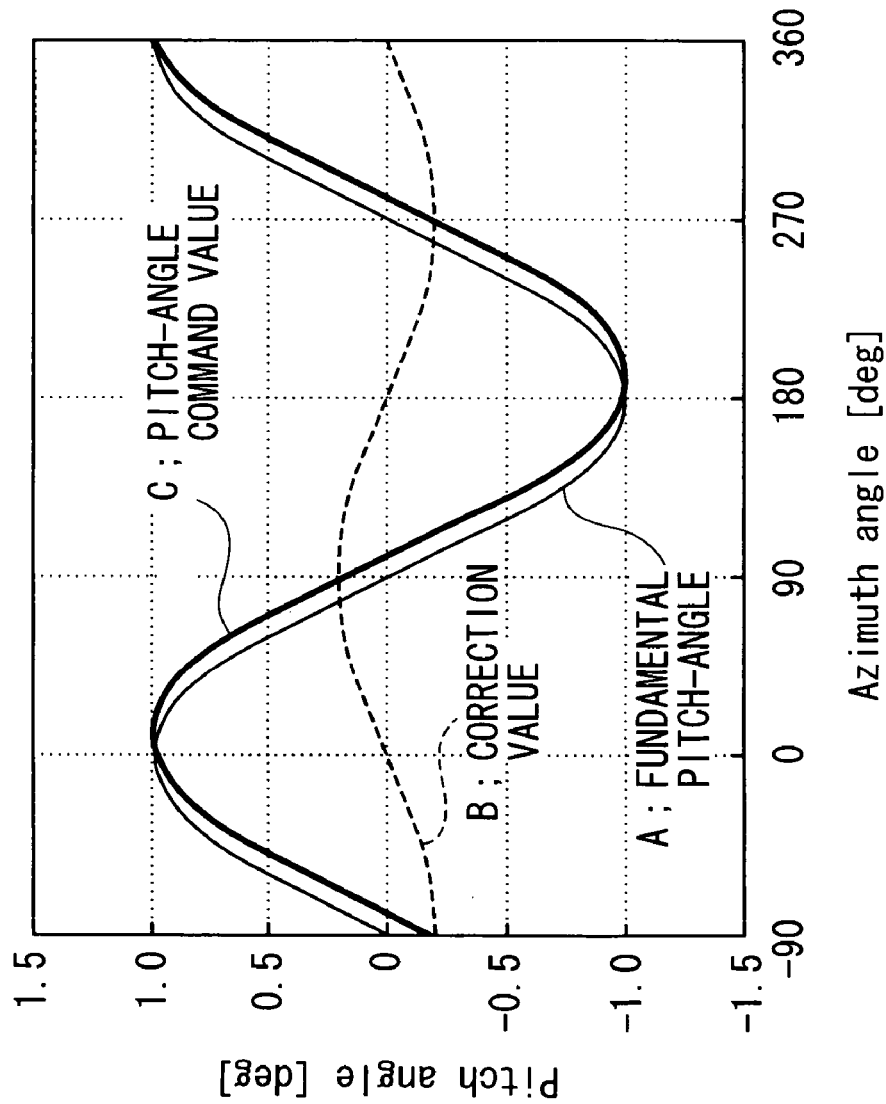
FIG. 5 a graph showing an example of a characteristic table including a waveform of a pitch-angle correction value for canceling out the effect of a tilt angle on the wind when the wind speed is varied and a waveform in which the correction value is reflected.

In FIG. 5, line A shows a waveform of the fundamental pitch-angle shown in FIG. 4, line B shows a waveform of the correction value for canceling out the effect of the tilt angle, and line C shows a waveform of a pitch-angle command value obtained by adding the correction value of line B to the waveform of line A.

Thus, the characteristic table obtained when the wind speed is increased in the simulation is a characteristic table in which the upward-blowing wind due to the tilt angle is considered, and has characteristics different from those shown in FIG. 4, not only in terms of the amplitude but also in terms of the phase.

The wind direction also affects the load fluctuation of the blade.

For example, when an observer stands facing the windward side at the position of the windmill and the wind flows from the left side, the effect of the wind received increases at an azimuth angle of 0° and the effect of the wind received decreases at an azimuth angle of 180°.

Figure 6:
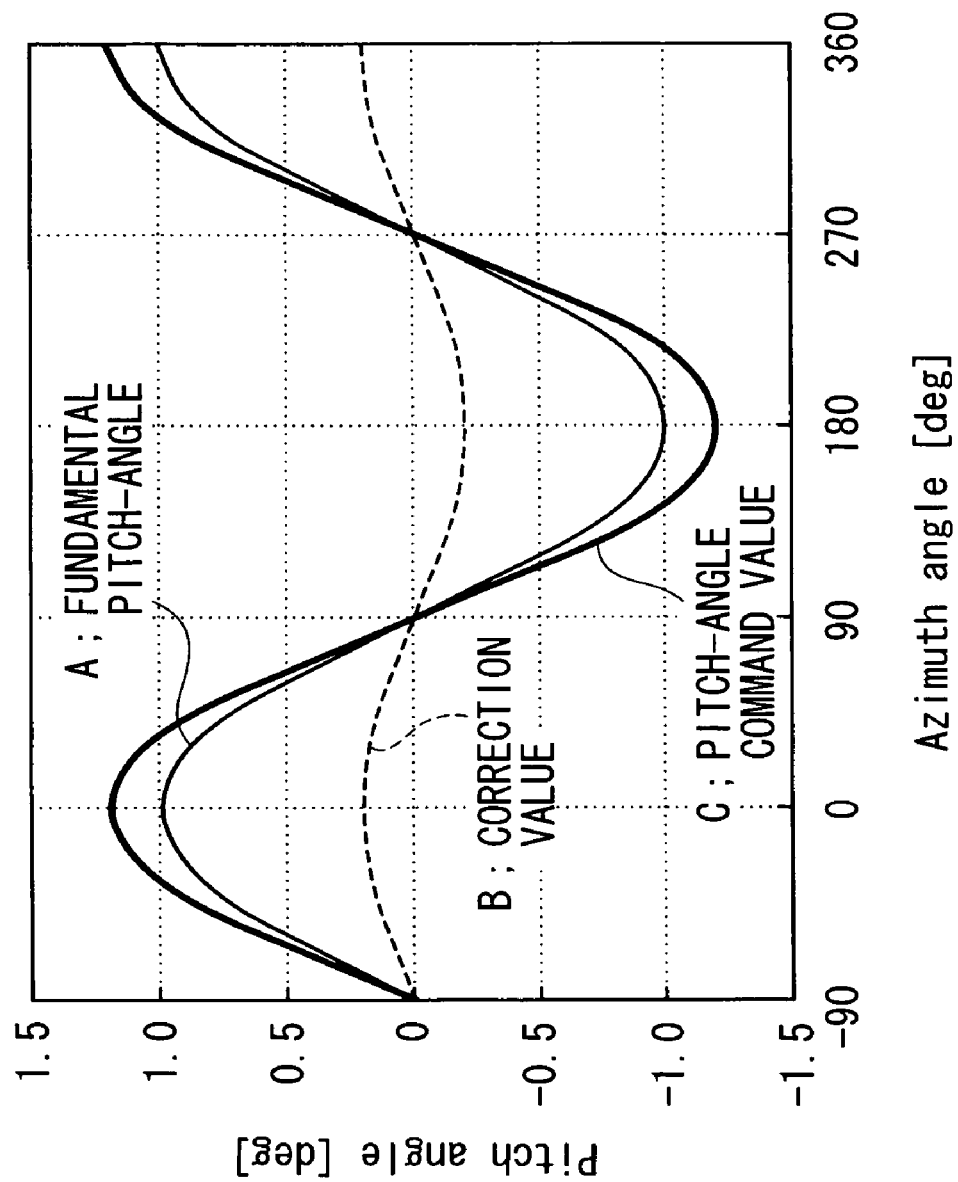
FIG. 6 a graph showing an example of a characteristic table including a waveform of a pitch-angle correction value for canceling out the effect of a deviation of wind direction when the wind speed is varied and a waveform in which the correction value is reflected.

Accordingly, a pitch-angle correction value for canceling out the effect of a deviation in wind direction exhibits the characteristics shown in FIG. 6.

In FIG. 6, line A shows a waveform of the fundamental pitch-angle shown in FIG. 4, line B shows a waveform of the correction value for canceling out the effect of the deviation in wind direction, and line C shows a waveform of a pitch-angle command value obtained by adding the correction value of line B to the waveform of line A.

Thus, the characteristic table obtained when the wind direction is varied in the simulation is a characteristic table in which the amplitude of the fundamental pitch-angle shown in FIG. 4 changes in the vertical direction.

Figure 7:
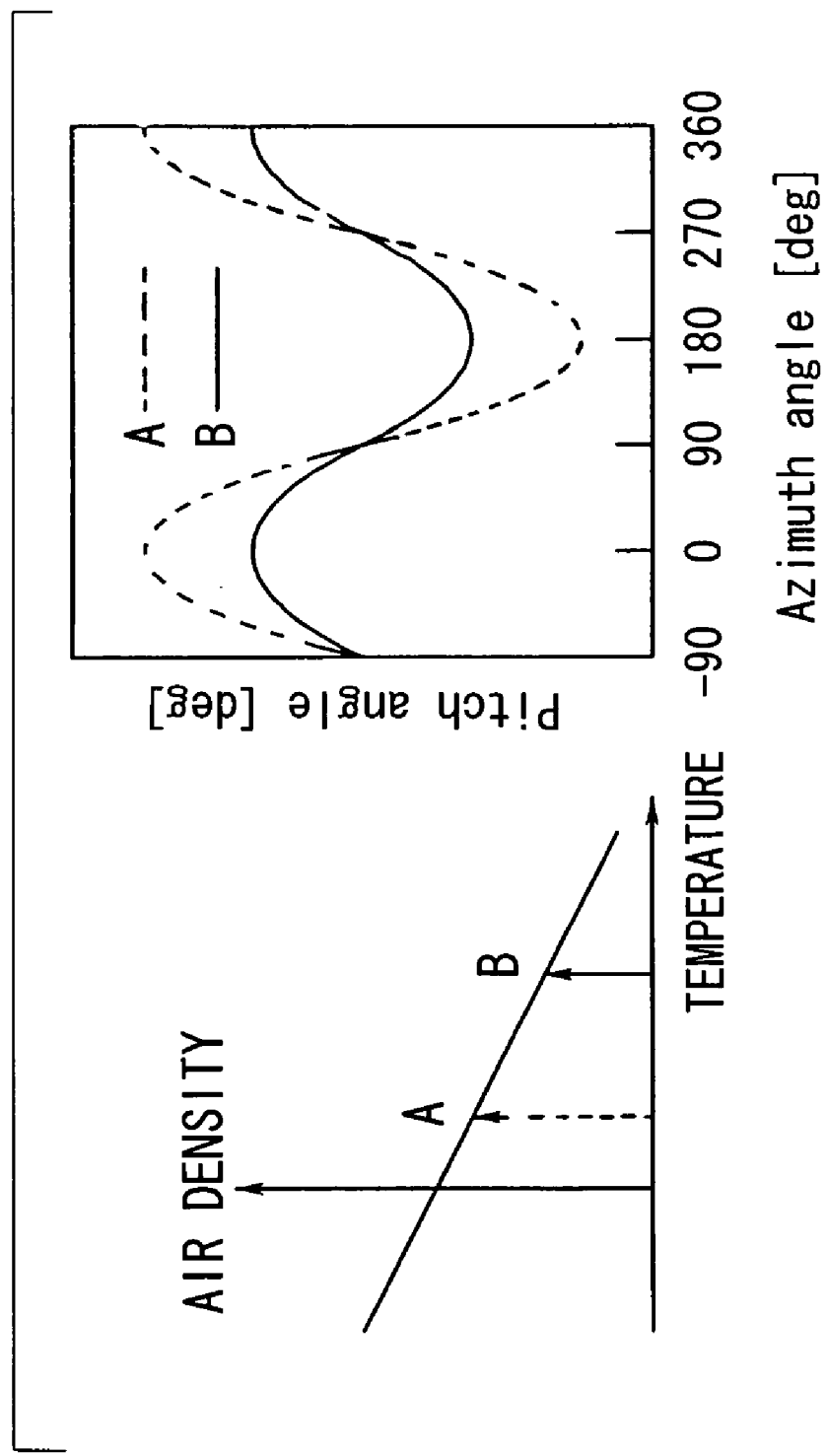
FIG. 7 a graph showing an example of a characteristic table when air density is used as a variable.

Next, when the wind speed and the power generation output of the wind power generator are set as fixed values and only the air density is varied, as the air density increases, the effect of the load fluctuation of the blade increases. Accordingly, in the case where the air density is varied in the simulation, as the air density increases, a characteristic table having an amplitude larger than the amplitude of the characteristic shown in FIG. 4 is obtained. FIG. 7 shows a characteristic table when the air density is used as a variable. In FIG. 7, line A shows a waveform of the pitch-angle command value when the air density is high, and line B shows a waveform of the pitch-angle command value when the air density is low.

Figure 8:
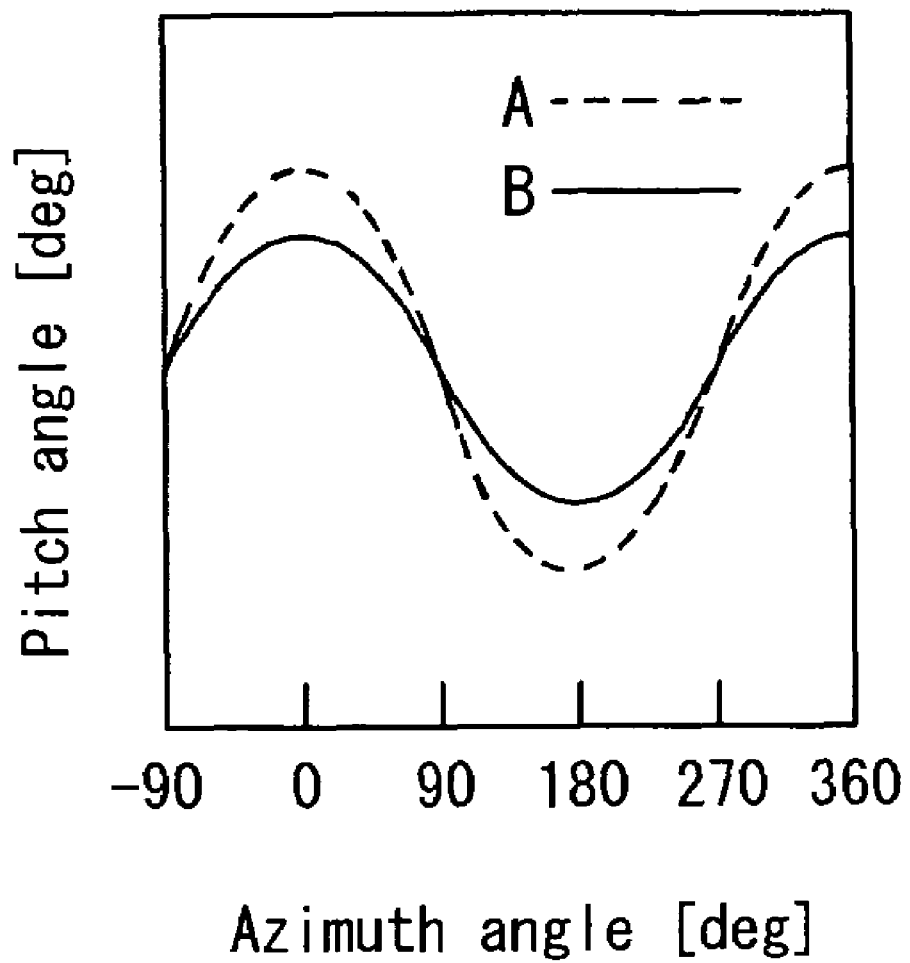
FIG. 8 a graph showing an example of a characteristic table when the output of the wind power generator is used as a variable.

Next, when the wind speed and the air density are set as fixed values and only the output of the wind power generator is varied, and the output is higher than the preset value (required output), a large aerodynamic force is applied to the blade, and furthermore, a large fluctuating aerodynamic force load is applied, compared with the case where the operation is performed with the required output. Accordingly, in the case where the output is higher than the required output, a characteristic table having an amplitude larger than the amplitude of the fundamental pitch-angle shown in FIG. 4 is obtained. FIG. 8 shows a characteristic table when the output of the wind power generator is used as a variable. In FIG. 8, line A shows a waveform of the pitch-angle command value when the output is high, and line B shows a waveform of the pitch-angle command value when the output is low.

The operation of the blade-pitch-angle control device according to the above-described embodiment will now be described.

First, when the command-value receiving unit 13 receives an azimuth angle from the azimuth-angle detecting unit 11 and receives the wind speed, air density, and power generator output from the parameter-detecting unit 12, the command-value receiving unit 13 then receives a characteristic table from the memory unit 10, the characteristic table being selected based on the wind speed, the air density, and the power generator output.

Subsequently, in the characteristic table received, pitch-angle command values corresponding to the azimuth angle of each blade input from the azimuth-angle detecting unit 11 are received.

Thus, pitch-angle command values corresponding to each of the first blade, the second blade, and the third blade can be obtained.

The command-value receiving unit 13 outputs these pitch-angle command values thus obtained to the pitch-angle-control command-value generating unit 14.

The pitch-angle-control command-value generating unit 14 generates pitch-angle-control command values for each of the blades by adding the pitch-angle command values input from the command-value receiving unit 13 to the common-pitch-angle command value based on the power generation output of the wind power generator, the common-pitch-angle command value being input from the common-pitch-angle command-value generating unit 15. The pitch-angle-control command-value generating unit 14 outputs these pitch-angle-control command values to the respective actuators provided on the corresponding blades.

Thus, the pitch-angle of each blade is controlled so as to be the most suitable angle for the operational state of the wind power generator at that time.

When the memory unit 10 does not store a characteristic table that completely corresponds with parameter values input from the parameter-detecting unit 12, a characteristic table that most closely approximates the parameter values may be selected. Alternatively, a plurality of approximate characteristic tables may be read out and these characteristic tables may be interpolated to determine the pitch-angle command values.

A blade-pitch-angle control device that is applied to a wind power generator using a constant-speed windmill has been described, but the blade-pitch-angle control device of the present invention can also be applied to a wind power generator using a variable-speed windmill.

A blade-pitch-angle control device that is applied to a wind power generator using a variable-speed windmill will now be described.

When a variable-speed windmill is used, the number of rotor revolutions is controlled according to the output of the wind power generator. The load fluctuation of each blade is also changed by varying the rotational speed (the number of revolutions). Therefore, when such a variable-speed windmill is used, the number of rotor revolutions must also be considered as a parameter. Specifically, with the configuration of the blade-pitch-angle control device shown in FIG. 1, the number of rotor revolutions is added as a parameter input to the command-value receiving unit 13, and the memory unit 10 stores characteristic tables in which the number of rotor revolutions is also considered.

The command-value receiving unit 13 receives a characteristic table from the memory unit 10, the characteristic table being selected by the wind speed, the air density, the power generator output, and the number of rotor revolutions that are input. In the characteristic table received, pitch-angle command values corresponding to the azimuth angle of each blade input from the azimuth-angle detecting unit 11 are received. Each of the pitch-angle command values is then output to the pitch-angle-control command-value generating unit 14. The subsequent processes are the same as those of the first embodiment described above.

Although the above-described blade-pitch-angle control device can significantly reduce the load fluctuation generated in the blades, the device still generates not insignificant output fluctuation. It is known that the frequency band in which such an output fluctuation significantly occurs depends on the number of blades. Accordingly, a pitch-angle for eliminating such a significant output fluctuation is determined and the resulting pitch-angle is reflected in the blade-pitch-angle-control command value, thereby further decreasing the output fluctuation.

In this embodiment, an output-fluctuation eliminating device having the following function is added to the blade-pitch-angle control device shown in FIG. 1.

Figure 9:
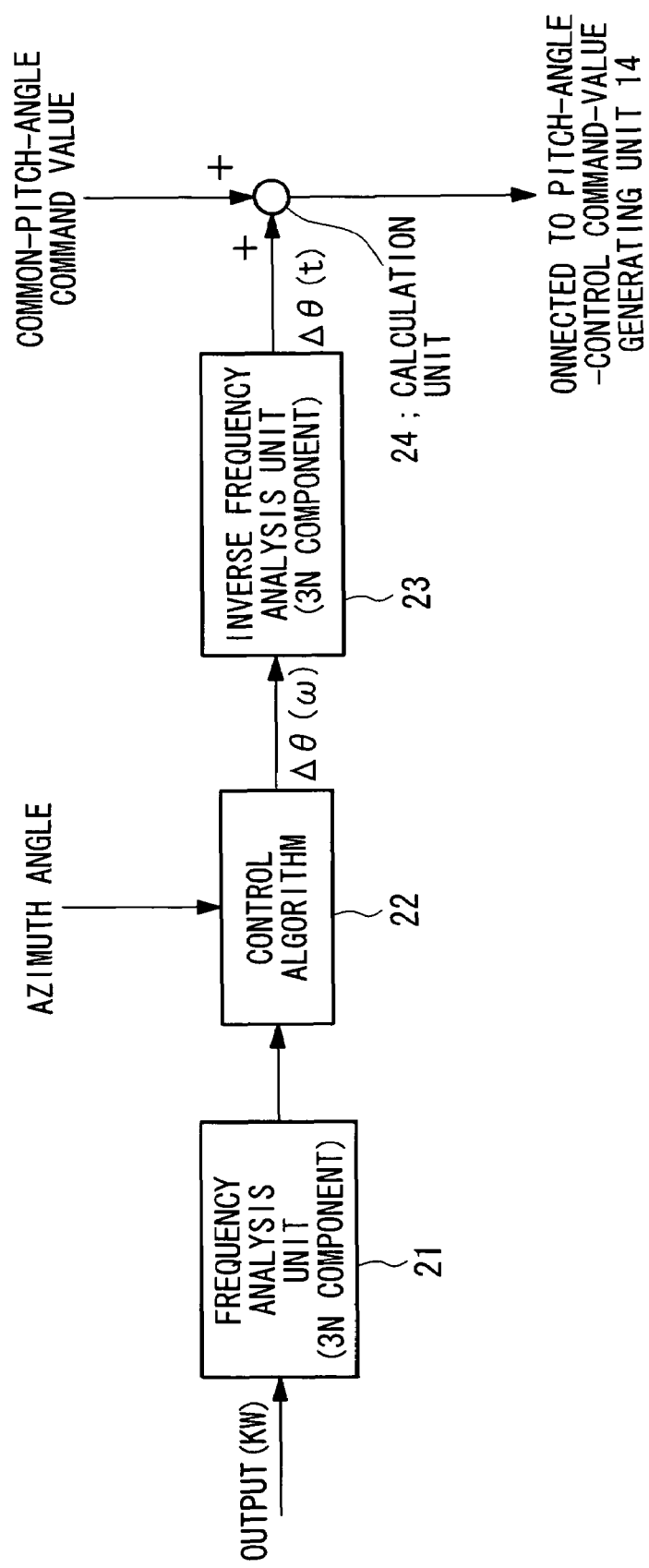
FIG. 9 a diagram showing the structure of an output-fluctuation eliminating device that is employed when a constant-speed windmill is used.

FIG. 9 shows the structure of the output-fluctuation eliminating device that is employed when a constant-speed windmill is used.

As shown in FIG. 9, the output-fluctuation eliminating device includes a frequency analysis unit (frequency-component extraction device) 21, a control algorithm (calculation device) 22, an inverse frequency analysis unit (calculation device) 23, and a calculation unit 24.

The frequency analysis unit 21 extracts a frequency component corresponding to an integral multiple of the number of blades from the output of the wind power generator and outputs the extracted frequency component. For example, when a windmill including three blades is used, a 3N component (N=integer) is extracted.

The control algorithm 22 obtains the frequency component output from the frequency analysis unit 21 and the azimuth angle detected by the azimuth-angle detecting unit 11 shown in FIG. 1 as input information. The control algorithm 22 calculates the information on the basis of a predetermined algorithm to calculate a fluctuating pitch-angle $\Delta\theta(\omega)$ in the frequency domain, and outputs the fluctuating pitch-angle $\Delta\theta(\omega)$.

The inverse frequency analysis unit 23 obtains the fluctuating pitch-angle $\Delta\theta(\omega)$ calculated by the control algorithm 22 as input information, calculates a fluctuating pitch-angle $\Delta\theta(t)$ in the time domain by performing an inverse frequency analysis, and outputs the fluctuating pitch-angle $\Delta\theta(t)$.

The calculation unit 24 obtains the fluctuating pitch-angle $\Delta\theta(t)$ in the time domain calculated by the inverse frequency analysis unit 23 and the common-pitch-angle command value output from the common-pitch-angle command-value generating unit 15 (refer to FIG. 1) as input information, adds these values so as to finely adjust the common-pitch-angle command value, and outputs the finely adjusted common-pitch-angle command value to the pitch-angle-control command-value generating unit 14 (refer to FIG. 1).

As described above, the frequency analysis unit 21 extracts a frequency component that significantly affects the load fluctuation of each blade from the output of the wind power generator. The control algorithm 22 and the inverse frequency analysis unit 23 calculate a pitch-angle at which such a frequency component is eliminated. The calculation unit 24 reflects the fluctuating pitch-angle output from the inverse frequency analysis unit 23 in the common-pitch-angle command value.

Thereby, only the significant output fluctuation can be eliminated at a single point and a stable power generation output can be maintained.

When a variable-speed windmill is used, in the output-fluctuation eliminating device in FIG. 9, the number of rotor revolutions is input as an input signal. In other words, since the output is controlled by the number of rotor revolutions in the variable-speed windmill, the fluctuating pitch-angle $\Delta\theta(t)$ is calculated by performing a frequency analysis of the number of rotor revolutions instead of the output. Thus, the blade-pitch-angles can be controlled more precisely even in variable-speed windmills.

The blade-pitch-angle control device according to the first embodiment of the present invention has been described in detail with reference to the drawings. The specific structure is not limited to this embodiment, however, and may also include design changes and the like within the spirit and the scope of the present invention.

For example, the various parameters are not limited to the above-described wind speed, air density, output of the wind power generator, and rotor speed (the number of revolutions), but may include any parameter that affects the output and the like during wind power generation.

Among these parameters, a pitch-angle obtained by considering fluctuations of all the parameters may be used. Alternatively, a pitch-angle obtained by considering some of the parameters (for example, only wind speed) may be controlled.

Furthermore, the parameters are not limited to those that are synchronously detected. For example, the wind speed and the azimuth angle may be detected at predetermined intervals, and the air density and the like, whose temporal change is small, may be detected at time intervals longer than those used for the wind speed and the azimuth angle.

Second Embodiment

A blade-pitch-angle control device according to a second embodiment of the present invention will now be described.

Figure 10:
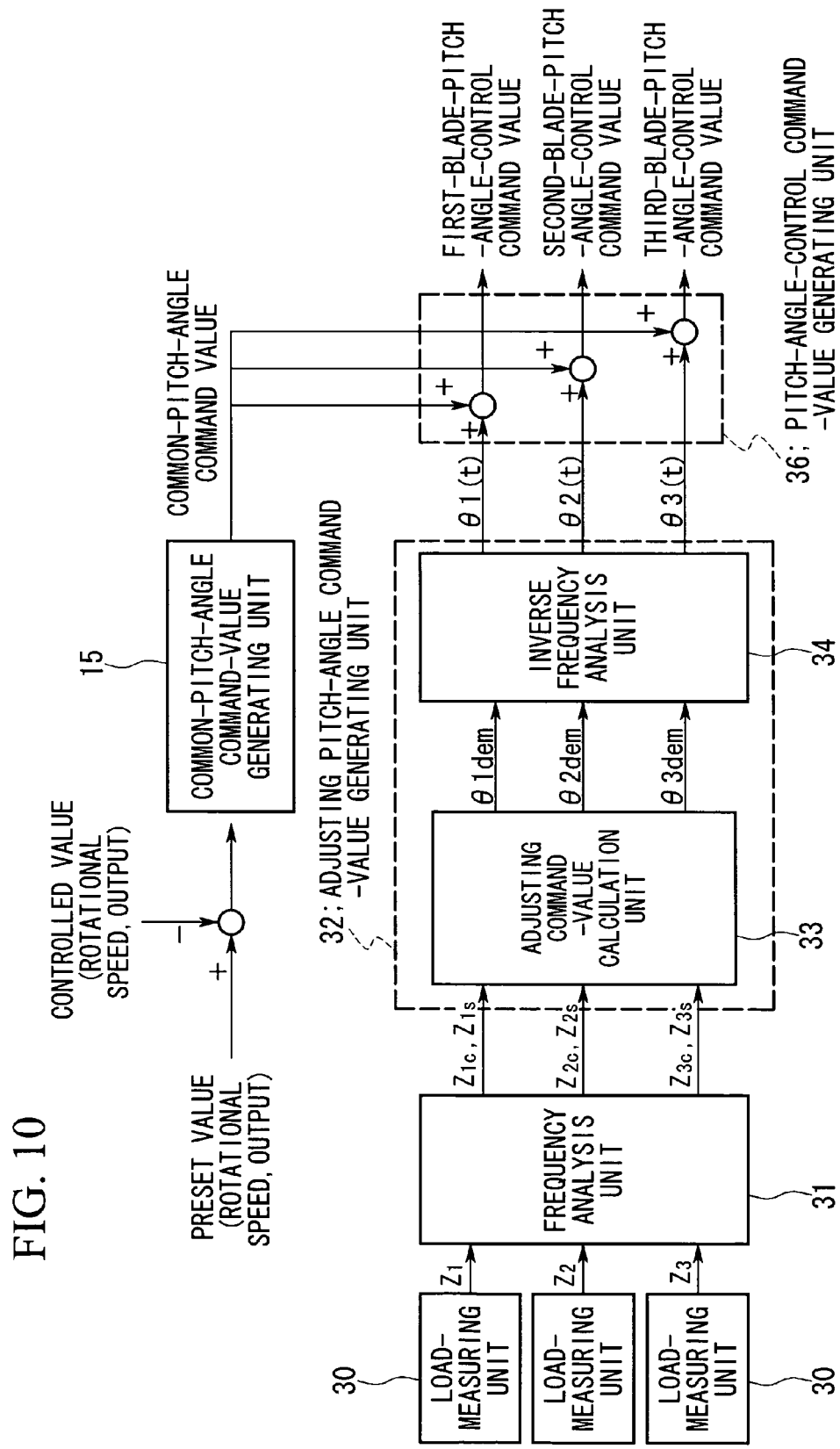
FIG. 10 a block diagram showing the structure of a blade-pitch-angle control device according to a second embodiment of the present invention.
Figure 11:
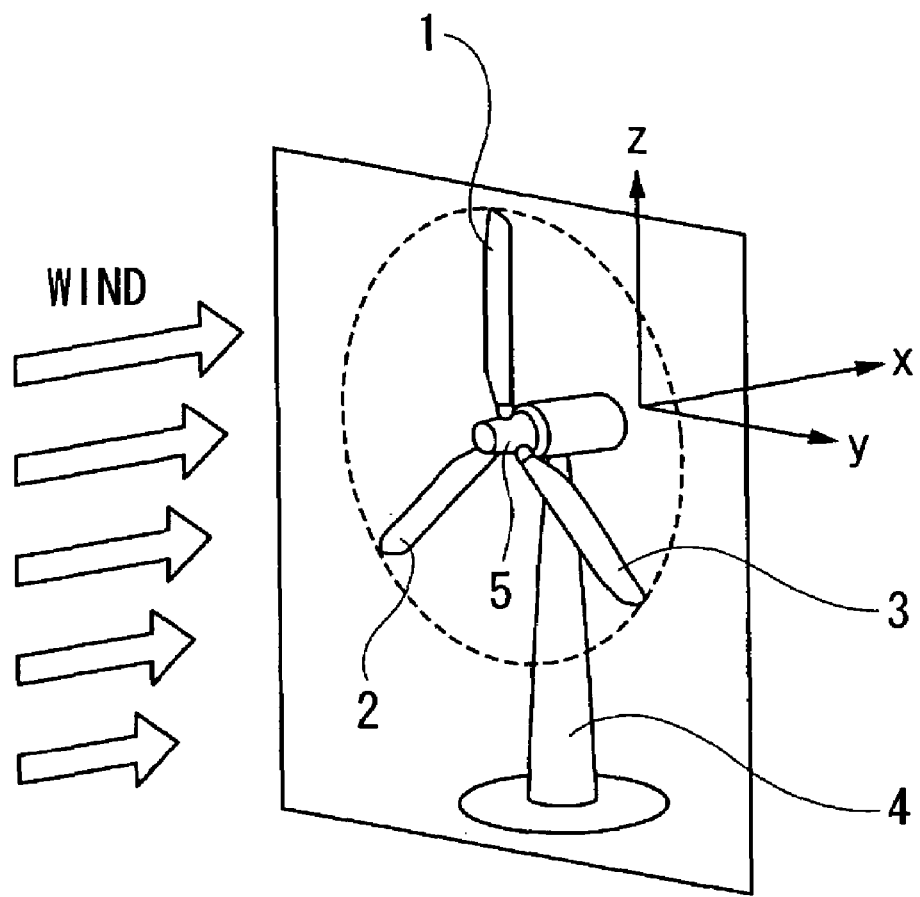
FIG. 11 a schematic view of a propeller windmill used in a wind power generator.
Figure 12:
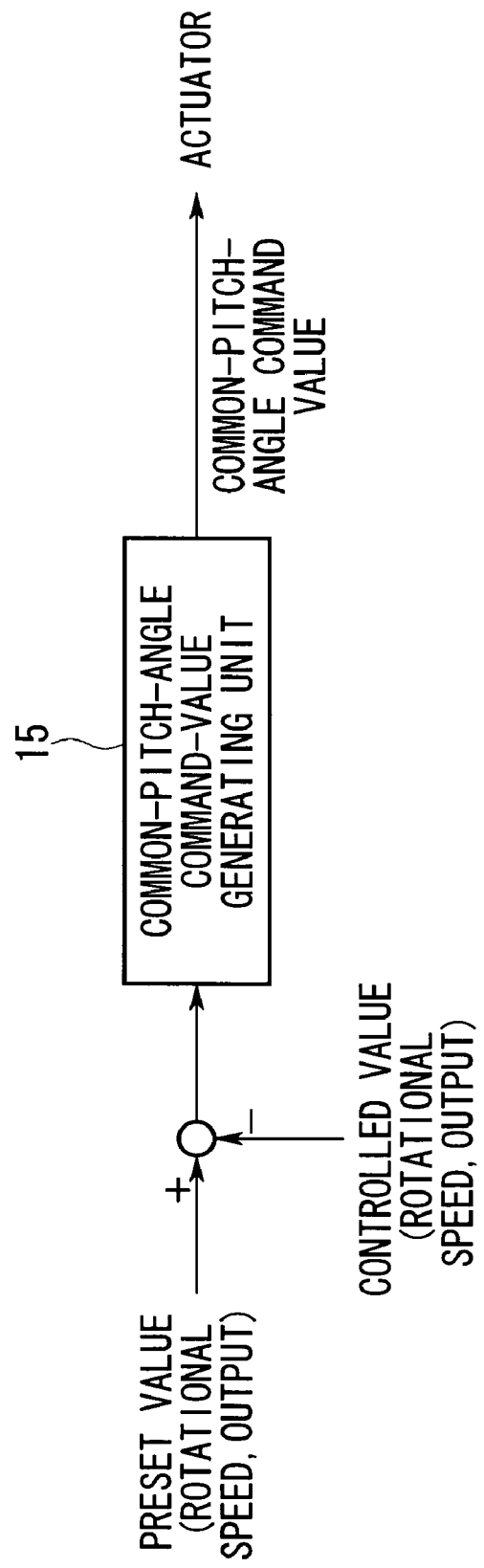
FIG. 12 a block diagram showing an example of the structure of a blade-pitch-angle control device according to a known art.

FIG. 10 is a block diagram showing the structure of a blade-pitch-angle control device that is applied to a wind power generator used in a variable-speed windmill.

As shown in FIG. 10, the blade-pitch-angle control device according to the present embodiment includes load-measuring units (load-measuring devices) 30, a frequency analysis unit (calculation device) 31, an adjusting pitch-angle generating unit (adjusting pitch-angle command-value generating device) 32, a pitch-angle-control command-value generating unit (pitch-angle-control command-value generating device) 36, and a common-pitch-angle command-value generating unit 15.

Each of the load-measuring units 30 measures a load applied to a corresponding blade at predetermined azimuth angles (for example, every 6°), and outputs the measurement results as an electrical signal.

The load-measuring unit 30 includes, for example, an azimuth-angle measuring instrument (azimuth-angle measuring device), a trigger-generating circuit (trigger-generating device), and a sensor (measuring device). The azimuth-angle measuring instrument measures the azimuth angles of each blade at predetermined time intervals. The trigger-generating circuit generates a trigger signal when the measurement result of the azimuth-angle measuring instrument matches a predetermined azimuth angle (for example, an angle that is a multiple of 6°). The sensor measures the load on the basis of the trigger signal of the trigger-generating circuit. Examples of the sensor for measuring the load include a strain gauge, a load cell, and an optical fiber sensor that are installed in the blade base portion or a part of the windmill.

The frequency analysis unit 31 obtains measured values (loads) measured at predetermined azimuth angles as input signals from the load-measuring units 30, and calculates a periodic fluctuation of the load applied to each blade on the basis of the measured values. Specifically, when measured values corresponding to one revolution are obtained, azimuth-angle characteristics of the load are calculated using the following computational expressions (1.1) and (1.2). The azimuth-angle characteristics can be expressed by a cosine component $Z_{ic}$ and a sine component $Z_{is}$ of the load.

$$\{Z_{ic}\}_n = \frac{2}{K}\sum_{k=1}^{K} zi(nk\Delta\psi)\cos(nk\Delta\psi) \quad (1.1)$$

$$\{Z_{is}\}_n = \frac{2}{K}\sum_{k=1}^{K} zi(nk\Delta\psi)\sin(nk\Delta\psi) \quad (1.2)$$

In expressions (1.1) and (1.2), symbol i represents the blade number. When a wind power generator includes three blades, i=1, 2, or 3. Symbol n represents an integer that is varied according to the cycle of the load fluctuation to be considered. When n=3, it means that the fluctuating load is considered three times during one revolution of a rotor. Symbol K represents the number of measurements in the azimuth angle range from 0° to 360°. For example, "K=12" means that the load is measured 12 times while the rotor 5 rotates once. Symbol $\Delta\psi$ represents a value obtained by dividing 360° by K.

Symbol $zi(nk\Delta\psi)$ represents a load value measured at each azimuth angle, which is an input signal from the load-measuring unit 30.

Subsequently, the adjusting pitch-angle command-value generating unit 32 obtains the analysis results of the frequency analysis unit 31 as input information, and generates an adjusting pitch-angle command value for reducing the load fluctuation for each blade on the basis of the analysis results. The adjusting pitch-angle command-value generating unit 32 includes an adjusting command-value calculation unit 33 and an inverse frequency analysis unit 34.

The adjusting command-value calculation unit 33 obtains the cosine components $Z_{ic}$ and the sine components $Z_{is}$ of the load fluctuation, which are calculated by the frequency analysis unit 31, as input signals, and calculates the input signals $Z_{ic}$ and $Z_{is}$ using a predetermined transfer function. Thereby, an adjusting command value θdem for eliminating a significant load fluctuation that periodically occurs is calculated for each blade. The adjusting command values $\theta_1$dem, $\theta_2$dem, and $\theta_3$dem that are calculated here are values in the frequency domain.

An example of a method for determining the transfer function used in the adjusting command-value calculation unit 33 is a method in which a simulation is performed while various load fluctuations are assumed, the optimum adjusting command values are obtained by analyzing the simulation results, and a transfer function is determined from the results.

Alternatively, a plurality of transfer functions may be defined according to the operational state of the windmill. The optimum transfer function may be selected according to the operational state of the windmill and used. Thus, more suitable adjusting command values can be determined.

Subsequently, the inverse frequency analysis unit 34 converts the adjusting command values $\theta_1$dem, $\theta_2$dem, and $\theta_3$dem, which are calculated by the adjusting command-value calculation unit 33 and which are values in the frequency domain, into values in the time domain.

In other words, originally, these adjusting command values are values calculated on the basis of the loads measured by the load-measuring units 30 at predetermined azimuth angles. Therefore, information handled by the frequency analysis unit 31 and the adjusting command-value calculation unit 33 includes characteristics and adjusting command values that are obtained by the change in angle.

In contrast, a common-pitch-angle command value determined by the common-pitch-angle command-value generating unit 35, which will be described below, is a command value obtained by the change in time, that is, a time-base command value. Therefore, these command values must be consistent with each other.

Accordingly, the inverse frequency analysis unit 34 converts the adjusting command values $\theta_1$dem, $\theta_2$dem, and $\theta_3$dem into values $\theta_1(t)$, $\theta_2(t)$, and $\theta_3(t)$, respectively, in the time domain using information on the azimuth angle at that time and a predetermined function.

The inverse frequency analysis unit 34 transmits the converted adjusting command values $\theta_1(t)$, $\theta_2(t)$, and $\theta_3(t)$ as adjusting pitch-angle command values to the pitch-angle-control command-value generating unit 36.

The adjusting pitch-angle command values for reducing the load fluctuation are input from the adjusting pitch-angle command-value generating unit 32 to the pitch-angle-control command-value generating unit 36. The common-pitch-angle command value is also input as a feedback control value for matching the output at that time with a target value from the common-pitch-angle command-value generating unit 36 to the pitch-angle-control command-value generating unit 36. This common-pitch-angle command value is a command value that is common to each blade. The pitch-angle-control command-value generating unit 36 adds the input common-pitch-angle command value to each of the adjusting pitch-angle command values $\theta_1(t)$, $\theta_2(t)$, and $\theta_3(t)$ for each blade, thereby generating pitch-angle-control command values for individually controlling the pitch angle of each blade. The pitch-angle-control command-value generating unit 36 then outputs the pitch-angle-control command values to the actuators that control the pitch-angle of each blade.

Consequently, the pitch-angle of each blade is controlled by the corresponding actuator on the basis of the control command value.

As described above, the blade-pitch-angle control device according to this embodiment provides the following advantages.

First, since the load-measuring units 30 measure the load at predetermined azimuth angles regardless of the rotational speed of the blades, this device can be advantageously applied not only to a constant-speed windmill but also to a variable-speed windmill, in which the rotational speed of the blades changes depending on the operational state.

Second, the load-measuring units 30 measure the load applied to each blade at predetermined azimuth angles, the frequency analysis unit 31 analyzes the periodic fluctuation characteristics of the load, the adjusting pitch-angle command-value generating unit 32 determines the adjusting pitch-angle command values for eliminating the load fluctuation on the basis of the analysis results, and the pitch-angle-control command-value generating unit 36 causes these adjusting pitch-angle command values to be reflected in the control of the pitch-angle of each blade. Thus, a significant load fluctuation that periodically occurs can be reduced.

Third, this device focuses on the fact that a significant load fluctuation of the blades periodically occurs and aims at reducing the periodic load fluctuation. Therefore, even when a time-lag due to the feedback control occurs, the fluctuating load can be eliminated with high accuracy. Thereby, the load fluctuation can be efficiently reduced by a process much simpler than the conventional pitch-angle control that reduces instantaneous load fluctuations. Consequently, each blade can be controlled so as to have the optimum pitch-angle and the lifetime of the blades and mechanical parts constituting the windmill can be extended.

Fourth, since the load-measuring unit 30 includes an azimuth-angle measuring instrument that measures the azimuth angle of each blade at predetermined time intervals, a trigger-generator that generates a trigger signal when the measurement result matches a predetermined azimuth angle, and a sensor that measures the load on the basis of the trigger signal, the load-measuring unit 30 can be simply realized. Alternatively, the load-measuring unit 30 may include, for example, an encoder that generates a trigger when the azimuth angle reaches a predetermined angle and a sensor that measures the load on the basis the trigger. Since such an encoder and a sensor are generally well known mechanisms, the load-measuring device can be simply realized.

The second embodiment of the present invention has been described in detail with reference to the drawings. The specific structure is not limited to this embodiment, however, and may also include design changes and the like within the spirit and the scope of the present invention.

First, instead of the load-measuring units 30 of the above embodiment, by employing acceleration-measuring units that measure the acceleration of the blades, the acceleration of the blades at predetermined azimuth angles may be measured to calculate the optimum pitch-angle for reducing the acceleration. Thus, the acceleration of the blades or mechanical parts constituting the windmill can be reduced. In addition, upon receiving a load fluctuation, the blades or the mechanical parts constituting the windmill vibrate and generate acceleration. Because of this correlation, the load fluctuation can also be reduced by reducing the acceleration in the above-described manner.

Second, the case in which the blade-pitch-angle control device is applied to a variable-speed windmill has been described in the above embodiment, but the blade-pitch-angle control device according to the above embodiment can also be applied to a wind power generator using a constant-speed windmill. In such a constant-speed windmill, information input to the common-pitch-angle command-value generating unit 15 is not the rotational speed of the power generator but the output of the power generator, and the common-pitch-angle command value is determined so that the output of the power generator matches the target value.

Third, the processes performed by the above frequency analysis unit 31, the adjusting command-value calculation unit 33, the inverse frequency analysis unit 34, the common-pitch-angle command-value generating unit 15, and the pitch-angle-control command-value generating unit 36 may be realized with a single computer device. This is performed by recording a program for realizing the function of each unit on a recording medium that can be read by a computer, reading the program recorded on the recording medium by a computer system, and executing the program.

The invention claimed is:

1. A blade-pitch-angle control device used for a wind power generator having a plurality of blades, the blade-pitch-angle control device comprising:
   a memory device in which predetermined parameters that affect the load fluctuation of the blades, azimuth angles, and pitch-angle command values are stored in association with each other;
   an azimuth-angle detecting device that detects the azimuth angle of each of the blades;
   a parameter-detecting device that detects the predetermined parameters;
   a command-value receiving device that receives the pitch-angle command values for each of the blades from the memory device, the pitch-angle command values being selected on the basis of the azimuth angle of each blade detected by the azimuth-angle detecting device and the predetermined parameters detected by the parameter-detecting device; and
   a pitch-angle-control command-value generating device that generates pitch-angle-control command values for individually controlling the pitch-angle of each blade on the basis of the pitch-angle command values received by the command-value receiving device and a common-pitch-angle command value that is common to each blade, the common-pitch-angle command value being determined by output information of the wind power generator.

2. The blade-pitch-angle control device according to claim 1, wherein the pitch-angle command values stored in the memory device are set to values in which the wind shear characteristics at the installation location of the wind power generator are reflected.

3. The blade-pitch-angle control device according to claim 1, wherein the predetermined parameters comprise the wind speed, and the parameter-detecting device is a wind-speed estimating device that includes a characteristic table relating the wind speed and an output of the wind power generator and that estimates the wind speed by reading out a wind speed corresponding to the output of the wind power generator from the characteristic table.

4. The blade-pitch-angle control device according to claim 1, further comprising:
   a frequency-component extraction device that extracts a frequency component corresponding to an integral multiple of the number of blades from any one of the power generation output of the wind power generator, the number of revolutions of the power generator, and the number of rotor revolutions; and
   a calculation device that calculates a pitch-angle for eliminating the load fluctuation due to the frequency fluctuation on the basis of the extracted frequency-component, wherein the pitch-angle-control command-value generating device causes the pitch-angle calculated by the calculation device to be reflected in the pitch-angle-control command value.

5. A wind power generator having a plurality of blades, comprising:

a blade-pitch-angle control device including a memory device in which predetermined parameters that affect the load fluctuation of the blades, azimuth angles, and pitch-angle command values are stored in association with each other;

an azimuth-angle detecting device that detects the azimuth angle of each of the blades;

a parameter-detecting device that detects the predetermined parameters;

a command-value receiving device that receives the pitch-angle command values for each of the blades from the memory device, the pitch-angle command values being selected on the basis of the azimuth angle of each blade detected by the azimuth-angle detecting device and the predetermined parameters detected by the parameter-detecting device; and a pitch-angle-control command-value generating device that generates pitch-angle-control command values for individually controlling the pitch-angle of each blade on the basis of the pitch-angle command values received by the command-value receiving device and a common-pitch-angle command value that is common to each blade, the common-pitch-angle command value being determined by output information of the wind power generator.

* * * * *